United States Patent [19]
Lesartre et al.

[11] Patent Number: 5,796,975
[45] Date of Patent: Aug. 18, 1998

[54] OPERAND DEPENDENCY TRACKING SYSTEM AND METHOD FOR A PROCESSOR THAT EXECUTES INSTRUCTIONS OUT OF ORDER

[75] Inventors: Gregg B. Lesartre; Donald Kipp, both of Fort Collins, Colo.

[73] Assignee: Hewlett-Packard Company, Palo Alto, Calif.

[21] Appl. No.: 653,573

[22] Filed: May 24, 1996

[51] Int. Cl.$^6$ .................................................. G06F 9/38
[52] U.S. Cl. ........................ 395/394; 395/391; 395/393
[58] Field of Search ................................. 395/393, 394, 395/390, 391

[56] References Cited

U.S. PATENT DOCUMENTS

| | | | |
|---|---|---|---|
| 5,467,473 | 11/1995 | Kahle et al. | 395/392 |
| 5,487,156 | 1/1996 | Popescu et al. | 395/393 |
| 5,497,499 | 3/1996 | Garg et al. | 395/393 |
| 5,553,256 | 9/1996 | Fetterman et al. | 395/393 |
| 5,586,278 | 12/1996 | Papworth et al. | 395/582 |
| 5,613,080 | 3/1997 | Ray et al. | 395/390 |
| 5,694,577 | 12/1997 | Kiyohara et al. | 395/494 |

OTHER PUBLICATIONS

H1291 (Hinton et al.), Feb. 1, 1994.

*Primary Examiner*—Parshotam S. Lall
*Assistant Examiner*—Gautam R. Patel

[57] ABSTRACT

An operand dependency tracking system tracks move-to-space (MTSP) operand dependencies among instructions in a processor that executes instructions out of order. Instructions are forwarded from an instruction fetch mechanism to a reordering mechanism, where the instructions are permitted to execute out of order. After execution of an instruction by an execution unit, instructions are retired by a retire mechanism, which transforms the results of instruction execution to the architecture state. While instructions are executed in the reordering mechanism, the operand dependency tracking system detects an MTSP instruction and a load instruction. The MTSP instruction is destined to modify data in a space register that stores virtual address information. The load instruction is controlled to commence execution after the MTSP instruction commences execution. While executing the load instruction, the tracking system determines whether the load instruction is destined to use the data in the space register. When the load instruction is destined to use the data in the space register, then the tracking system performs the following steps: determines if the MTSP instruction is retired, (2) when the MTSP instruction is not retired, then aborts execution of the load instruction and repeats steps (b) and (d)(1) successively until the MTSP instruction is retired from execution; and (3) when the MTSP instruction is retired, completes execution of the load instruction. Finally, when the load instruction is not destined to use the data in the space register, then the tracking system completes execution of the load instruction regardless of when the MTSP instruction retires from execution.

19 Claims, 6 Drawing Sheets

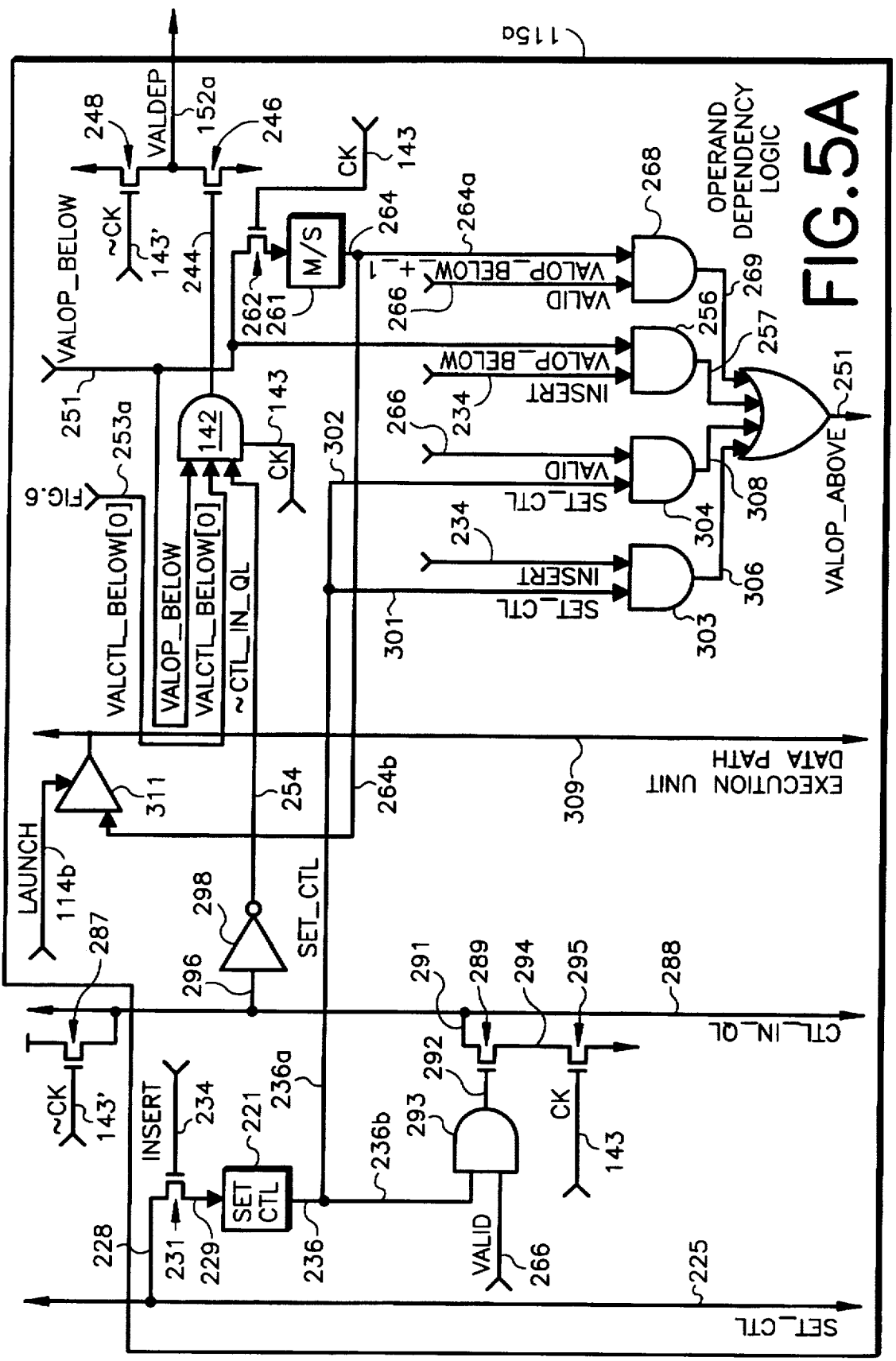

OPERAND DEPENDENCY TRACKING SYSTEM AND METHOD FOR A PROCESSOR THAT EXECUTES INSTRUCTIONS OUT OF ORDER

FIELD OF THE INVENTION

The present invention generally relates to computer processors that execute instructions out of order, and more particularly, to a system and method for tracking operand dependencies among instructions in a processor that executes instructions out of order. The system and method is particularly suited to track move-to-space (MTSP) operand dependencies, although not limited to this particular application.

BACKGROUND OF THE INVENTION

A computer processor (processing unit) generally comprises a control unit, which directs the operation of the system, and one or more arithmetic execution units, which perform computational operations. The execution units can include an arithmetic logic unit (ALU) for integer operations and a multiple accumulate unit (MAC) for floating point operations. The overall design of a processor involves the selection of a register set(s), communication passages between these registers, and a means of directing and controlling how these operate. Normally, a processor is directed by a program, which includes of a series of instructions that are kept in a main memory. Each instruction is a group of bits, usually one or more words in length, specifying an operation to be carried out by the processor. In general, the basic cycle of a processor comprises the following steps: (a) fetch an instruction from memory into an instruction register; (b) decode the instruction (i.e., determine what it indicates should be done; each instruction indicates an operation to be performed and the data to which the operation should be applied); (c) carry out the operation specified by the instruction; and (d) determine where the next instruction is located. Normally, the next instruction is the one immediately following the current one.

However, in high performance processors, such as superscalar processors wherein two or more scaler operations are performed in parallel, the processor may be designed to execute instructions out of order, or in an order that is not consistent with that defined by the software program driving the processor. In these systems, instructions are executed when they can be executed, as opposed to when they appear in the sequence defined by the program. Moreover, after execution of out of order instructions, the results are ultimately reordered to correspond with the instruction order, prior to passing the results back to the program.

Out of order execution of instructions poses peculiar obstacles from a design perspective. One such obstacle involves instruction dependencies. An instruction, called the "dependent" instruction, is dependent upon another instruction, called the "producer" instruction, when the dependent instruction operates upon an operand or result that is produced by the producer instruction.

As an example, consider the scenario when a load instruction has a potential dependency on a move-to-space (MTSP) instruction. As is known in the art, an MTSP instruction involves moving data into space registers. Space registers are in an architectural sense control registers that store address information that is utilized to derive virtual addresses. In this scenario, the load instruction uses the space that is to be modified by the MTSP instruction, and therefore, the load instruction should be executed only after the MTSP instruction has retired and placed the modified data in the space registers.

Generally, dependent instructions are placed after their producer instructions in program order and, therefore, in a typical processor that executes instructions in order, the dependent instructions are executed after their producer instructions. However, in a processor that executes instructions out of order, unless safeguards are implemented, it is possible that a dependent instruction may be executed prior to the producer instruction from which it depends. If this occurs, then the load instruction will utilize the incorrect address space, and the software will yield incorrect results. Thus, a heretofore unaddressed need exists in the industry for a system and method for tracking operand dependencies, particularly MTSP operand dependencies, among instructions in a processor that executes instructions out of order.

SUMMARY OF THE INVENTION

The invention provides an operand dependency tracking system and method for tracking operand dependencies, for example, move-to-space (MTSP) dependencies, among instructions in a processor that executes instructions out of order. Though the novel system and method is particularly suited to track MTSP operand dependencies, they are in general not limited to this particular application.

In the operand dependency tracking system of the invention, an instruction fetch mechanism obtains instructions and forwards them to a reordering mechanism, where the instructions are permitted to execute out of order. In the preferred embodiment, an arithmetic queue (aqueue) and a memory queue (mqueue) are utilized in the reordering mechanism and receive the arithmetic and memory instructions respectively from the sort mechanism. Each of the queues has a plurality of slots for receiving respective instructions.

A retire mechanism is connected to the aqueue and the mqueue. After execution of an instruction by an execution unit, instructions are retired by the retire mechanism, which transforms the results of instruction execution to the architecture state. The software 18 (FIG. 1) is not made aware of any results that are not transformed to the architecture state by the retire mechanism 52.

While instructions are executed in the reordering mechanism, the operand dependency tracking system of the invention detects a producer instruction, such as an MTSP instruction, and a load instruction. The producer instruction is destined to modify data in a register that stores address information. In the case of an MTSP producer instruction, the MTSP instruction is destined to modify a space register that stores virtual address information. The load instruction is controlled to commence execution after the producer instruction commences execution. While executing the load instruction, the tracking system determines whether the load instruction is destined to use the data in the register being modified by the producer instruction.

When the load instruction is destined to use the data in the space register that is being modified, then the tracking system performs the following steps: determines if the producer instruction is retired, (2) when the producer instruction is not retired, then aborts execution of the load instruction and repeats steps (b) and (d)(1) successively until the producer instruction is retired from execution; and (3) when the producer instruction is retired, completes execution of the load instruction. Finally, in the alternative, i.e., when the load instruction is not destined to use the address information in the register, then the tracking system completes execution of the load instruction regardless of when the producer instruction retires from execution.

The invention has many advantages, a few of which are delineated hereafter, as merely examples.

An advantage of the invention is that it permits out of order execution of instructions in a processor by tracking MTSP operand dependencies.

Another advantage of the invention is that it permits tracking of operand dependencies, such as MTSP operand dependencies, with minimal hardware and space requirements.

Another advantage of the invention is that it permits tracking of MTSP operand dependencies with reliability.

Another advantage of the invention is that it is simple in design and easily implemented on a mass scale for commercial production of processors.

Other objects, features, and advantages of the present invention will become apparent to one with skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

FIGS. 5A and 5B are block diagrams of a possible implementation of the operand dependency logic of FIG. 4 for tracking producer and dependent instructions using a propagation mechanism (as opposed to a broadcast mechanism).

DETAILED DESCRIPTION OF THE PREFERRED EMBODIMENT

Figure 1:
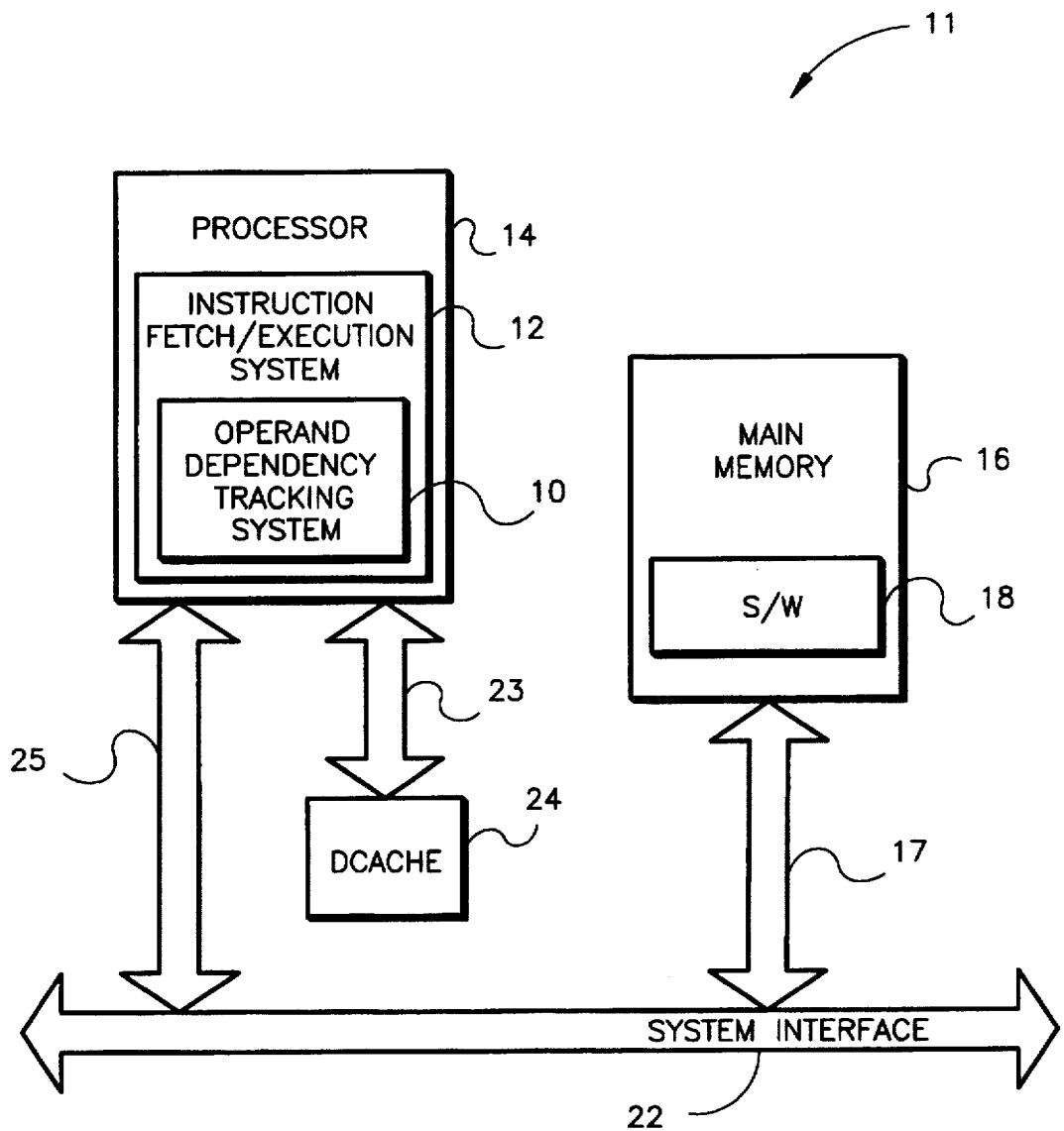
FIG. 1 is a block diagram of a possible implementation of a computer that can implement the operand dependency tracking system of the invention.

As shown in FIG. 1, the operand dependency tracking system 10 and associated methodology of the present invention is implemented within a computer 11, and particularly, within a fetch/execution system 12 within a processor 14 of the computer 11. The processor 14 is configured to execute instructions out of order, and the operand dependency tracking system 10 tracks operand dependencies, for example but not limited to, move-to-space (MTSP) operand dependencies, associated with instructions in software (s/w) 18 so that dependent instructions are not executed prior to execution of their corresponding producer instructions. Generally, the operand dependency tracking system 10 is implemented in the processor 14 via the combination of abort logic 77 (FIG. 3), control logic 116 (FIG. 4), and operand dependency logic 115 (FIGS. 4, 5A, and 5B), all of which are described in detail hereinafter.

I. Out Of Order Processor

The processor 14 that executes instructions out of order is preferably situated in a computer 11, as shown in FIG. 1. The computer 11 generally includes the processor 14 with the instruction fetch/execution system 12, a main memory 16, such as a dynamic random access memory (DRAM), having the software 18 for driving the processor 14, a data cache 24 (dcache; optional) interconnected with the processor 14 as indicated by reference arrow 23, and a system interface 22, such as one or more buses, interconnecting the processor 14 and the main memory. The instruction fetch/execution system 12 in the processor 14 accesses and executes the software 18. As the instruction fetch/execution system 12 executes the software 18, data that is in current use in the processor 14 is moved into the dcache 24, thereby reducing the average access time for the processor's memory requests and minimizing traffic on the system interface 22.

II. Instruction Fetch/Execution System

Figure 2:
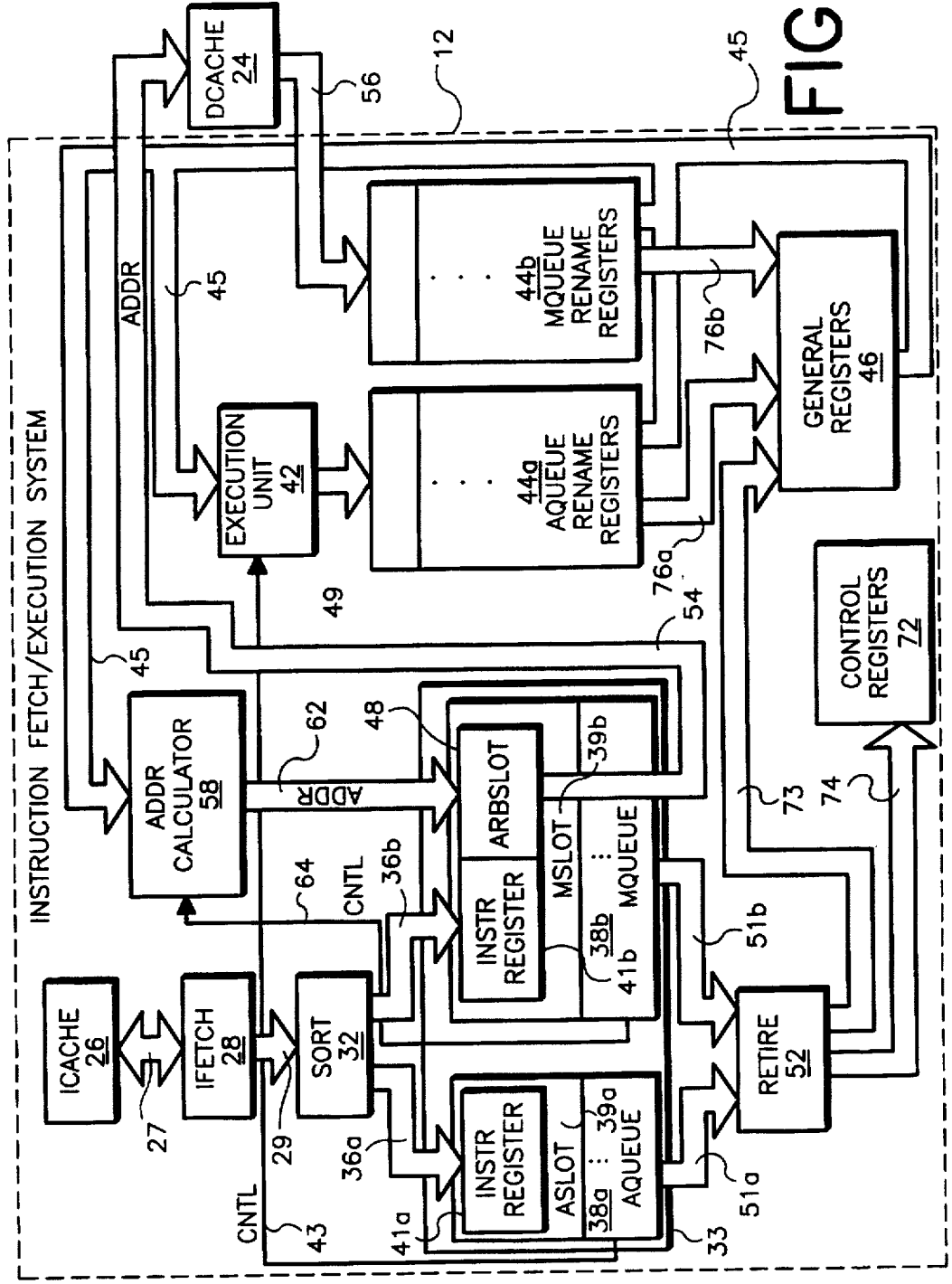
FIG. 2 is a block diagram of a possible implementation of the instruction fetch/execution system within the computer of FIG. 1.

A possible implementation of the instruction fetch/execution system 12 is illustrated by way of block diagram in FIG. 2. As shown in FIG. 2, the instruction fetch/execution system 12 has an instruction cache (icache) 26 for storing instructions from the software 18 (FIG. 1). An instruction fetch mechanism (ifetch) 28 communicates with the instruction cache 26 and retrieves instructions from the cache 26 for ultimate execution. In the preferred embodiment, the ifetch mechanism 28 fetches four instructions, each being 32 bits, at a time and transfers the instructions to a sort mechanism 32.

From the sort mechanism 32, the instructions are sent to a suitable reordering mechanism, such as a queue(s) or reservation station. In the preferred embodiment, the instructions are sorted and distributed, or "inserted," into an arithmetic logic unit (ALU) queue (aqueue) and a memory queue (mqueue), depending upon the operation to be accomplished by each instruction. More specifically, the sort mechanism 32 receives the instructions from the ifetch mechanism 28 and determines whether each instruction is directed to an operation involving either (a) an arithmetic execution unit 42 (i.e., either an arithmetic logic unit (ALU) for integer operations or a multiple accumulate unit (MAC) for floating point operations) or (b) the memory 43 (i.e., the dcache 24 or the main memory 16). The sort mechanism 32 distributes arithmetic and memory instructions along respective paths 36a and 36b that are ultimately destined for the aqueue 38a and the mqueue 38b, respectively.

The aqueue 38a contains a plurality (28 in the preferred embodiment) of aslots 39a that have registers 41a for storing respective instructions that are directed to provoking operations at one or more (2 in the preferred embodiment) execution units 42. The arithmetic instructions in the aqueue 38a are executed in any order possible (preferably, in data flow fashion). When execution of an instruction is commenced in either the aqueue 38a or the mqueue 38b, then the instruction is said to have "launched." The execution unit 42 retrieves one or more operands from rename registers (RRs) 44a, 44b and general registers (GRs) 46, pursuant to each instruction, and operates upon the operands. As an instruction completes operation upon operands, the results are captured by the aqueue RRs 44a, as indicated by reference arrow 49 and the instruction is marked as complete in the particular aslot 39a of the aqueue 38a. In the preferred embodiment, the aqueue 38a receives up to four instructions (32 bits each) per cycle from the sort mechanism 32 and transfers up to two instructions (preferably, 32 bits each) per cycle to a retire mechanism 52, as indicated by reference arrow 51a.

The mqueue 38b contains a plurality (28 in the preferred embodiment) of mslots 39b. Each mslot 39b includes a register 41b for storing a respective memory instruction and includes an address reorder buffer slot (arbslot; in the preferred embodiment, there are 28 in number), denoted by reference numeral 48, for storing a respective address. Memory instructions in the mqueue 38b can be classified as "loads" and "stores" to memory. A "load" is a request to transfer data from memory 43 (the dcache 24 or the main memory 16) to a register, whereas a "store" is a request to transfer data from a register to memory 43.

With respect to instructions that are directed to the mqueue 38b, the instructions are passed through a slot correspondence logic (not shown for simplicity), which can be any suitable logic or state machine, for ensuring that the program order of the instructions can be tracked, notwithstanding the separate queues 38a, 38b. The instructions are placed in respective slots (aslot, mslot) 39a, 39b within the aqueue 38a and mqueue 38b, and the slot correspondence logic 35 ensures that successive instructions can be tracked.

During execution of an instruction, a first phase involves executing a prescribed mathematical operation on operands in order to compute an address, and a second phase involves accessing the memory/cache for data based upon the calculated address. The mqueue 38b executes each of the instructions and the two phases (address computation and memory/cache access) of execution in any order possible (preferably, in data flow fashion). As the instructions complete, the results are captured by the mqueue rename registers 44b and the instruction is marked as complete in the mqueue 38b. In the preferred embodiment, the mqueue 38b receives up to four instructions (32 bits each) per cycle from the sort mechanism 32 and transfers up to two instructions (32 bits) per cycle to a retire mechanism 52, as indicated by reference arrow 51b.

More specifically, during the first phase of instruction execution, an address is generated by an address calculator 58. The address calculator 58 computes the address based upon operands retrieved from the rename registers 44b and passes the address (real or virtual) to an arbslot 48 corresponding to the instruction in the mqueue 38b, as indicated by reference arrow 62. Control of the calculation by the instruction is indicated by the reference arrow 64 in FIG. 2. When the second phase of memory instruction execution is pursued, the calculated address (including a cache index) is transferred to the dcache 24, as indicated by the reference arrow 54, to accomplish a load or a store at the dcache 24. In the preferred embodiment, two addresses are transferred each cycle, if possible, from the mqueue 38b to the dcache 24. Once the dcache 24 processes the address, the data results are transferred to the rename registers 44b, as indicated by reference arrow 56.

The retire mechanism 52 receives executed instructions (preferably, two 32-bit words per cycle) from each of the queues 38a, 38b. The retire mechanism 52 commits the instruction results to the architecture state. When the retire mechanism 52 commits an instruction's results to the architecture state or when the retire mechanism 52 ignores the results of an instruction that has been nullified in one of the queues 38a, 38b, then the retire mechanism 52 is said to have "retired" the instruction. The software 18 (FIG. 1) is not made aware of any results that are not transformed to the architecture state by the retire mechanism 52. The retire mechanism 52 retires the instructions in the queues 38a, 38b in the program order defined by the software 18 by moving the instruction results to a GR 46 and/or a control register 72, as indicated by respective reference arrows 73, 74, depending upon the instruction's attributes, and causes the results of the instructions to be passed from the RRs 44a, 44b to the GRs 46, as indicated by the reference arrows 76a, 76b.

III. Space Registers, Address Calculator, And Abort Logic

Figure 3:
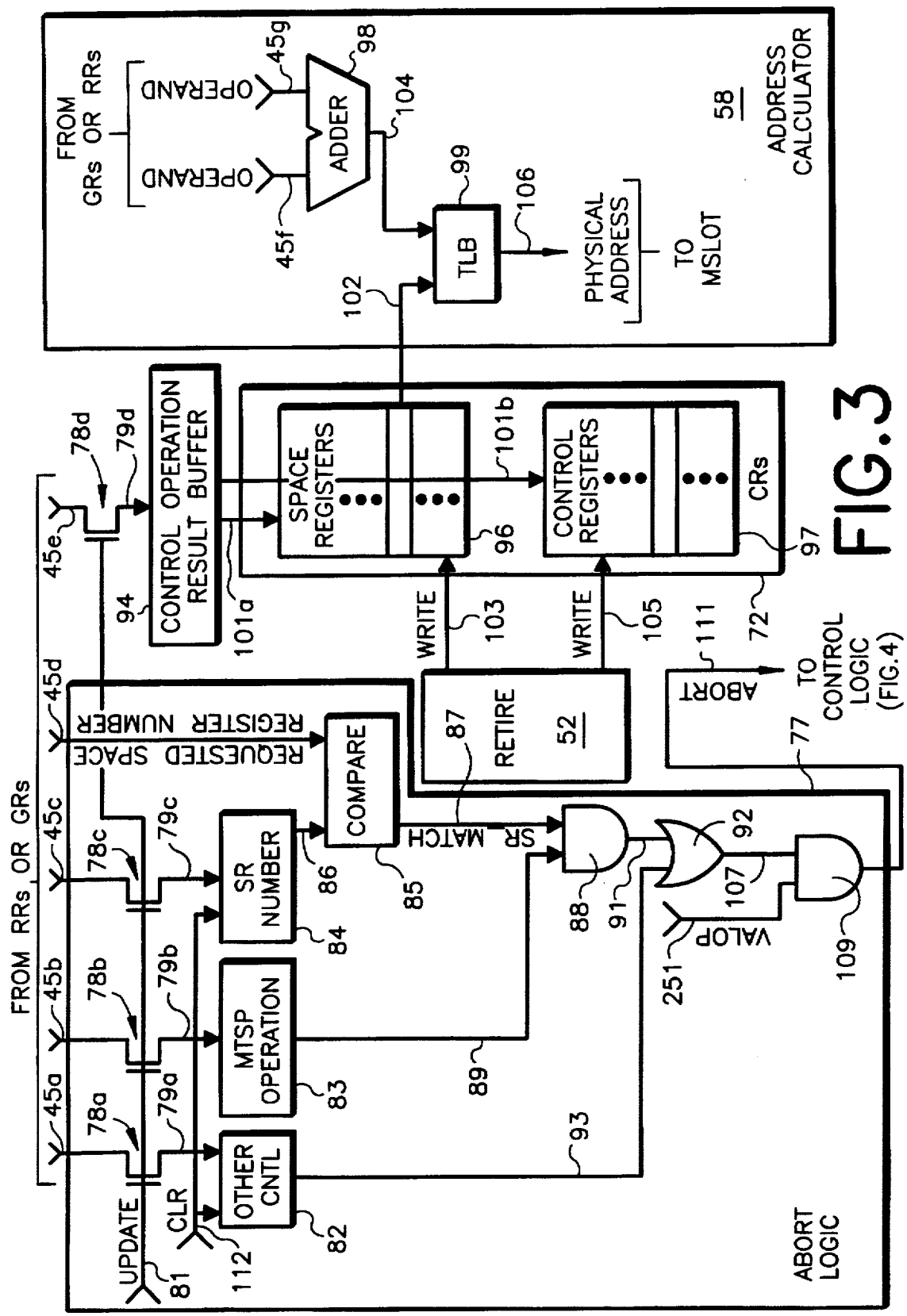
FIG. 3 is a block diagram of a possible implementation of an address calculator and abort logic associated with the instruction fetch/execution system of FIG. 2.

Space registers 96, the address calculator 58, and abort logic 77 will now be described with reference to FIG. 3. In general, the address calculator 58 utilizes address information from the space registers to compute addresses. Furthermore, if an MTSP instruction is modifying address space by operating upon data that is to be placed in the space registers 96 while a load instruction that uses the same address space is attempting to execute, then the abort logic 77 will abort the launch of the load instruction.

A control operation result buffer 94 is a register that is disposed in essentially the integer data path for receiving a data word 45e that indicates what control operations are to be performed, e.g., an MTSP operation, a protection identification (PID) register operation, etc. Note that in the preferred embodiment, only one control operation is performed at a time. Further, the control instruction causes data 45e to be transferred to the control operation result buffer 94 from the GRs 46 (FIG. 2) or the RRs 44b (FIG. 2).

The data word 45e is inserted in the control operation result buffer 94 via a transistors 79d when the transistor 78d is actuated by an update signal 81. The update signal 81 is asserted by the control logic of the integer data path when the control operation executes.

The CRs 72 include one or more space registers 96 and control registers 97 for receiving the control operands from the control operation result buffer 94, as indicated by respective reference arrows 101a, 10b, when the control instruction is retired. As shown, the retire mechanism 52 controls the space registers 96 and the control registers 97 to receive data via respective write controls 103, 105 when the control instruction is retired so that the data is committed to the architecture state.

The one or more space registers 96 are, in an architectural sense, control registers that store address information. Virtual memory is organized into linear spaces. These spaces can vary in size. In the preferred embodiment, the spaces can range in size from $2^{32}$ bytes each to $2^{64}$ bytes each. The object within the space is specified by a 32-bit to 64-bit offset. A space identifier is combined with the offset to form a complete global virtual address. Furthermore, the space identifiers are stored in the space registers 96.

The address calculator 58 computes an address from operands 45f, 45g pursuant to a memory instruction in order to access the main memory 16 or dcache 24. In architecture, the address calculator 58 includes an adder 98 for receiving the operands 45f, 45g from the RRs 44b or GRs 46 and a translation lookaside buffer (TLB) 99 that receives a result 104 from the adder 98. The TLB 99 receives a space identifier 102 from a space register 96 and the address result 104 from the adder 98, combines the foregoing data to create a full virtual address, and generates a physical address 106 from the full virtual address. The architecture and functionality of the TLB 99 are well known in the art. It is essentially an interface between the virtual address domain and the physical address domain. The physical address 106 is passed to the arbslot 48 of the mslot 39b (FIG. 2).

The abort logic 77 is configured to receive information regarding the control operation so that the abort logic 77 can make a determination as to whether the current instruction should be aborted. In this regard, when the data word 45e is placed in the control operation result buffer 94 pursuant to the update signal 81, the abort logic 77 receives control data 45a, space operation data 45b, and space register data 45c via respective transistors 78a, 78b, 78c. The data 45a, 45b, 45c is stored in respectively a control buffer 82, a space operation (space operation?) buffer 83, and a space register (sr) buffer 84. These buffers can be any suitable storage mechanism, such as one or more latches, registers, or the like.

When a later instruction launches execution, such as a load instruction, the abort logic 77 is configured to receive a requested space register number 45d pertaining to the requested address space register number. A compare mechanism 85 receives the space register number 86 from the space register buffer 84 and the requested space indicator 45d from the launching instruction, compares the data, determines whether there is a match, and outputs a match signal 87 indicative thereof. Hence, the match signal 87 is either asserted or deasserted to indicate respectively whether or not there is a space register match.

An AND logic gate 88 receives the match signal 87 along with a signal 89 from the space operation buffer 83. In essence, the AND logic gate 88 insures that the control operation using the control operation result buffer 94 is an MTSP operation. The output 91 from the AND logic gate 88 is either asserted or deasserted to indicate respectively whether or not the current instruction involves the same space register operation as the control instruction.

An OR logic gate 92 receives the signal 91 from the AND logic gate 88 and combines it with a signal 93 from the control buffer 82, which holds information pertaining to other control operations. Some other control operations, such as a PID operation, can cause initiation of the abort signal 111. The OR logic gate 92 generates a signal 107 that is either asserted or deasserted to indicate respectively whether or not the current instruction should be aborted. Using an AND logic gate 109, the signal 107 is combined with a valid operand (valop) signal 251 from the mslot 39b containing the instruction to indicate whether or not there is a valid operand dependency. The valop signal 251 is generated by the operand dependency logic 115 (FIGS. 4, 5A, and 5B) that will be described in further detail later in this document. The output 111 of the AND logic gate 109 is either asserted or deasserted to indicate respectively whether or not the current instruction should be aborted. The abort signal 111 is asserted when there is a valid operand dependency and when signal 111 indicates abort.

Figure 4:
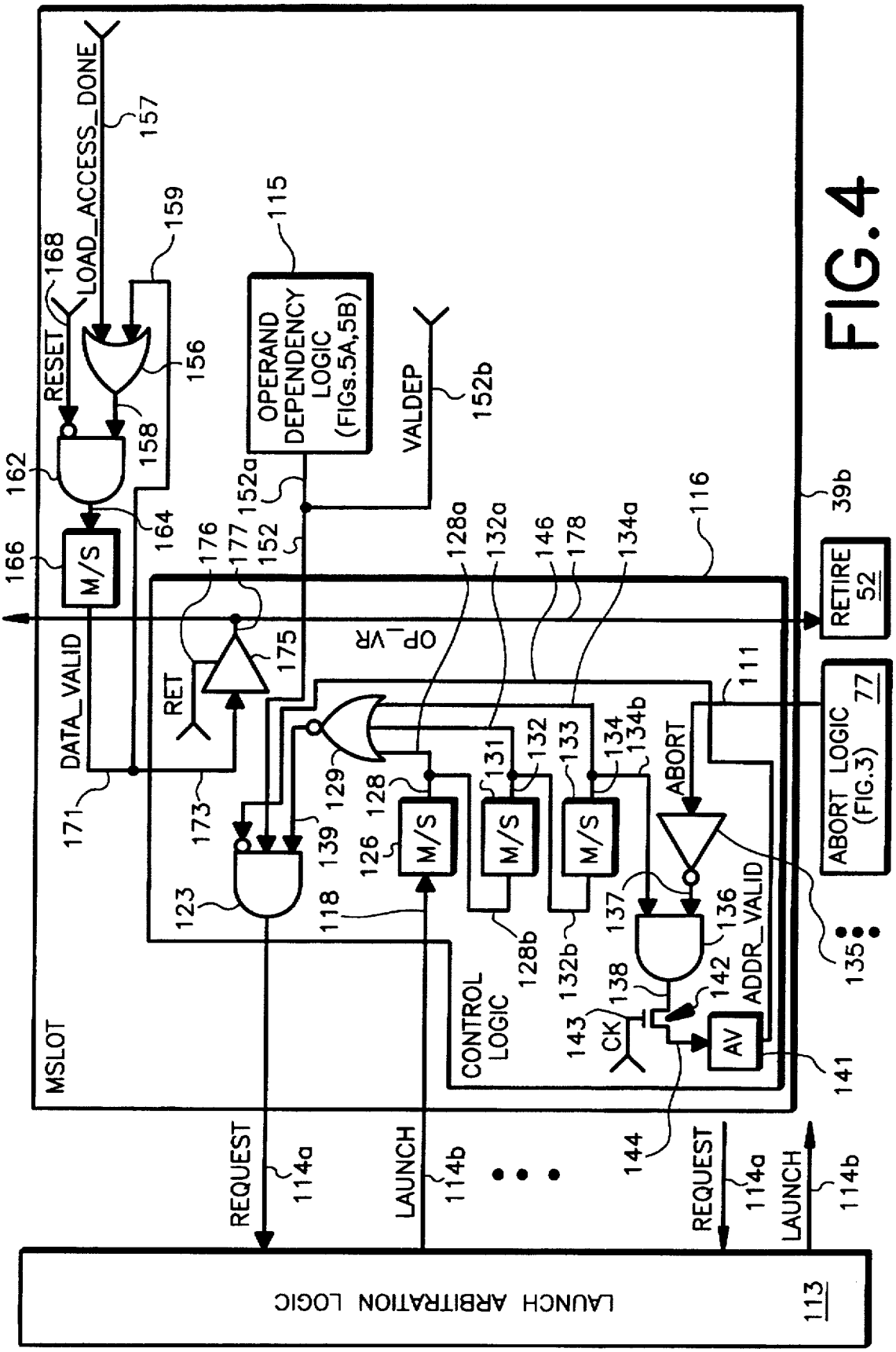
FIG. 4 is a block diagram of a possible implementation of control logic and operand dependency logic situated within a memory slot (mslot) within the memory queue (mqueue) of FIG. 2.

In operation, a load instruction in the mqueue 38b does not launch until any previous MTSP instruction or other superseding control operation executes. It is prevented from launching by the control logic 116 and the operand dependency logic 115 that will be further described later hereinafter with regard to FIG. 4. Referring to FIG. 3, when the MTSP or other superseding control instruction executes, it moves data 45a, 45b, 45c from the GRs 46 or the RRs 44a into the respective buffers 82, 83, 84 within the abort logic 77 and moves data 45e from the GRs 46 or the RRs 44a into the control operation result buffer 94, all pursuant to an asserted update signal 81. After the control instruction launches execution, the load instruction is allowed to launch by permission from the combination of the control logic 116 (FIG. 4) and the operand dependency logic 115 (FIG. 4).

When the load instruction launches, it causes the requested space register number 45d to be passed from its corresponding operation code (opcode), the GRs 46, or the RRs 44a to the compare mechanism 85 and causes operands 45f, 45g to be passed to the adder 98. The load instruction passes the register number 45d so that the abort logic 77 can determine whether or not there is a superseding control instruction, e.g., whether or not there is an MTSP instruction modifying the space in which the load instruction wishes to use or some other applicable control instruction, such as one that performs a PID operation.

If the load instruction intends to use the same space as an MTSP instruction or if another superseding control instruction is currently executing, then the abort logic 77 asserts signal 111, which causes the load instruction to be aborted. The load instruction is then iteratively launched and aborted until the MTSP or other applicable control instruction retires. When the MTSP or other applicable control instruction retires, then a clear signal 112 clears the buffers 82, 82, 84 so that the abort signal 111 is no longer asserted, and therefore, the dependent instruction is permitted to fully execute and retire.

If the space pertaining the control operation and the current instruction are not the same and if no other superseding control instruction is under way, then the abort logic maintains the abort signal 111 as deasserted, and the load instruction is permitted to fully execute by the control logic 116 (Fig. 4) (the operand dependency logic 115 (FIG. 4) is not involved at this point, as it previously permitted the load instruction to launch after the logic 115 detected that the MTSP producer instruction already launched). Finally, when the MTSP instruction or other applicable control instruction retires, then a clear signal 112 clears the buffers 82, 82, 84.

IV. Control Logic

FIG. 4 shows in detail the control logic 116 within each mslot 39b of the mqueue 38b for controlling the launch and retirement of instructions in the respective mslots 39b. Generally, the control logic 116 will prevent the launch of a local load instruction that depends upon a remote MTSP instruction, until after the remote MTSP instruction commences execution. Furthermore, the control logic 116 will abort execution if it receives an asserted abort signal 111 (FIG. 3) from the address calculator 58 (FIG. 3). Finally, the control logic will prevent the launch of a local instruction if, aside from the MTSP dependency, there are any other dependencies, such as nullify dependencies or operand dependencies, involving the local instruction, until after the dependencies are cleared.

As shown in FIG. 4, the plurality of mslots 39b are each connected to launch arbitration logic 113. The launch arbitration logic 113 is configured to receive launch requests 114a from the various mslots 39b when their respective dependencies have cleared, prioritize and arbitrate the launch requests 114a, and selectively grant requests via launch signals 114b at appropriate times. In structure, the arbitration logic 113 can be any suitable mechanism, such as a state machine, logic array, or logic processing system, configured to perform the aforementioned arbitration functionality. As an example, consider the implementation described in copending, commonly assigned, U.S. patent application entitled "Address Aggregation System And Method For Increasing Throughput Of Addresses To A Data Cache Of A Processor," filed on Mar. 1, 1996, and assigned Ser. No. 08/609,821, the disclosure of which is incorporated herein by reference. When an mslot 39b receives an asserted launch signal 114b, then the corresponding mslot 39b launches execution of its corresponding local instruction. When the launch signal 114b is deasserted, then the corresponding mslot 39b will refrain from launching execution.

Operand dependency logic 115 detects when instructions are dependent upon operands that are to be produced from other instructions while the instructions are in the mqueue 38b. The operand dependency logic 115 outputs a valid dependency (valdep) signal 152a that is passed to the control logic 123. The valdep signal 152a is deasserted by being precharged high upon insert of the local instruction into the mslot 39b. When a local instruction is dependent upon an operand to be produced by a remote producer instruction, then the operand dependency logic 115 will detect this dependency and assert the valdep signal 152a by pulling low the valdep signal 152a, until the dependency clears, i.e., until the producer instruction launches execution. The architecture and functionality of the operand dependency logic 115 will be further described later with reference to FIGS. 5A and 5B.

Although an optional feature relative to the claimed invention, in the preferred embodiment, the control logic 116 also receives valid dependency (valdep) signals 152b from other dependency tracking systems to indicate whether or not there are any other yet uncleared dependencies that should be accommodated prior to launching.

When asserted, or pulled low, a valdep signal 152b prevents the control logic 116 from asserting the launch request 114a. When deasserted, or precharged high, then the particular valdep signal 152b will permit the control logic 116 to assert the launch request 114a. An example of another possible dependency tracking mechanism is that for tracking nullify operand dependencies. For a possible implementation for tracking a nullify operand dependency, see copending commonly assigned U.S. patent application (Docket No. 10951234) entitled "Instruction Nullification System And Method For A Processor That Executes Instructions Out Of Order," by inventor Gregg Lesartre, the disclosure of which is incorporated herein by reference.

In architecture, the control logic 116 includes an AND logic gate 123 for generating the request signal 118. When (a) the MTSP instruction has launched, (b) the local instruction is not dependent on any other instruction, and (c) the local mslot 39b has not received a launch signal 114b within three cycles, then the AND logic gate 123 will assert the signal 118 to request a launch. The AND logic gate 123 receives a signal 139 to indicate whether or not the launch signal 114b is asserted within the designated three cycles, the combined valdep signal 152 to indicate whether or not the local instruction has other dependencies on other remote instructions, and a not address valid signal 146 to indicate whether or not the local instruction has already calculated its address. When all the foregoing signals are asserted, then the AND logic gate 123 will assert its output 118, which thereby causes the control logic 116 to make a launch request 114a.

The launch signal 114b from the launch arbitration logic 113 is received by the control logic 116 for one mslot 39b based upon the requests 114a. As shown in FIG. 4, the launch signal 114b is passed to a master/slave (m/s) latch 126, which is clocked by the clock CK. The output 128 of the latch 126 is passed to a NOR (not OR) logic gate 129 via line 128a and is also passed to the input of another clocked m/s latch 131 via line 128b. The latch 131 is also clocked by the clock CK. The output of the latch 131 is passed to the NOR logic gate 129 via line 132a and also to the input of another clocked m/s latch 133 via line 132b. The latch 133 is also clocked by the clock CK. The output 134 of the latch 133 is passed to the NOR logic gate 129 via line 134a and also to an AND logic gate 136 via line 134b. When the launch signal 114b is asserted, the lines 128, 132, 134 are asserted on successive clock cycles. Accordingly, the NOR logic gate 129, which produces output 138, will deassert its output 138 during the first three cycles that a launch signal 114b is asserted and will assert the output 138 otherwise.

The AND logic gate 136 receives the signal 134b from the latch 133 and also receives the inversion of the abort signal 111 (FIG. 4) from the local inverter 135, which receives the abort signal 111 from the control operation result buffer 94 (FIG. 4). When the abort signal 111 is deasserted and when the signal 134b is asserted, then the AND logic gate 136 will assert its output 138. The output 138 is clocked to a address valid (AV) latch 141 via a transistor 142 and the clock CK 143.

The AV latch 141 produces a address valid signal 146. In essence, when the address valid signal 146 is asserted, then a valid address has been computed by the address calculator 58. Further, when the address valid signal 146 is deasserted, then a valid address has not yet been computed.

The control logic 116 includes logic for indicating to the retire mechanism 52 (FIG. 2) when the local instruction has completed execution and is ready to be retired. In this regard, an OR logic gate 156 is disposed to receive a load access done signal 157 and a data valid signal 159 in order to generate an output 158. The load access done signal 157 indicates by assertion or deassertion whether or not respectively the local instruction is done with its operation. In other words, it indicates whether the local memory instruction is done accessing the dcache 24 and the data to be loaded resides in the RRs 44b (FIG. 2). The signal 158 is combined with the inversion of an abort signal 168 at an AND logic gate 162, which produces output 164 that is latched into m/s latch 166. The m/s latch 166 is set on assertion of the load access done signal 157 and remains set until an asserted reset signal 168 is received.

The reset signal 168 is generated by a mispredicted branch mechanism (not shown for simplicity). It is asserted or deasserted to indicate whether or not respectively a previous branch instruction has been mispredicted. When mispredicted, this feature enables purging of the instructions after the mispredicted branch instruction. The reset signal 168 is also routinely asserted to flush the mslot 39b when the mslot 39b should be empty after retirement of the local instruction.

The output 171 from the m/s latch 166 is connected to input line 159 of OR logic gate 156 to latch in the load access done signal 157 and also to a driver 175. The driver 175 is actuated by a retire pointer 176 to drive the data valid signal 173 onto connection (op__vr; operation valid and ready to retire) 178 that is connected to the retire mechanism 52. The op__vr signal 178 indicates when an instruction has executed a valid operation and is ready to retire.

There is a retire pointer for each mslot 39b. The set of retire pointers indicates where the next instruction(s) to retire are located in the mqueue 38b. In the preferred embodiment, at any given time, two instructions are retired at a time and thus two retire pointers are asserted at a time, thereby indicating the oldest instructions. In essence, the retire pointers are generated from a circular shift chain with two latches in the chain containing an asserted variable ("1"), each of which transitions to a deasserted variable ("0") whenever the associated mqueue instruction retires.

V. Operand Dependency Logic

The specific details of a possible implementation of the operand dependency logic 115 will now be described with reference to FIGS. 5A and 5B, which show respectively valdep/valop logic 115a and valctl logic 115b.

In general, the operand dependency logic 115 in each mslot 39b produces a valid operand (valop) signal 251 that is forwarded to the immediately following adjacent mslot 39b to indicate respectively whether or not a valid control operation dependency precedes the following mslot 39b, i.e., whether or not a producer control instruction is still unretired in program order prior to the following instruction in the following mslot 39b. The operand dependency logic 115 is configured to prevent the local instruction from launching execution until after the remote producer instruction commences execution, based upon the valid operand signal(s) from the previous slot. In this way, dependencies are set and cleared in a propagation manner, rather than in a broadcast manner.

In the preferred embodiment, the valop signal 251 is utilized during insert and retirement of instructions to and from the mqueue 38b. On insert, the valop signal 251 indicates to the newly inserted instruction whether or not it is dependent upon a previous instruction in the mqueue 38b. Further, on retirement of a producer instruction, the valop signal 251 is deasserted and propagated.

The operand dependency logic 115 can be practiced by utilizing only the valop signal 251 or an equivalent; however, a dependent instruction would in general need to wait for its producer instruction to retire before commencing execution. Therefore, in order to further enhance performance, another valid operand signal valctl[0] 253a (FIG. 5A and 5B) is propagated from mslot 39b to mslot 39b so that dependent instructions are advised of a dependency clearing prior to retirement of their producer instructions. In other words, when a producer instruction executes, but has not yet retired, then the second valid operand signal is asserted and propagated to advise any dependent instructions. Finally, another valid operand signal valctl[1] (FIG. 5B) is asserted and deasserted from mslot 39b to mslot 39b for controlling propagation of the valid operand signal valctl[0].

With reference to FIG. 5A, the valdep/valop logic 115a is designed to set and clear dependencies in its corresponding mslot 39b. The valdep/valop logic 115a includes a set_ctl indicator 221. The set_ctl indicator 221 can be any suitable logic storage device, including for example, a latch or register. The indicator 221 is set upon insert of an instruction into the local mslot 39b by the sort mechanism 32 via successively the following: set_ctl connection 225 from the sort mechanism 32, connection 228, and transistor 231, which is actuated by an insert signal 234. The insert signal 234 is generated by the aslot control logic.

The set_ctl indicator 221 generates a set_ctl signal 236 that indicates whether or not the local instruction is a producer instruction, i.e., whether the local instruction will generate a ctl operand for a remote dependent instruction. The set_ctl signal 236 does not prevent a launch of the local instruction, but merely serves to ultimately generate the valop signal 251 and the valctl signals 253 to advise a remote dependent instruction of the dependency and its status.

An AND logic gate 242 controls assertion and deassertion of the valdep signal 152a via an output 244 that actuates a transistor 246 based upon inputs to the AND logic gate 242. The valdep signal 152a is clocked, or precharged, to a high logic state via a transistor 248 and a not clock signal (~CK) 143'. In the preferred embodiment, the valdep signal 152a is asserted when it is pulled low, or discharged, and deasserted when it remains precharged. The AND logic gate 242, which is clocked by the clock signal (CK) 143, receives the following inputs: the valop signal 251 that indicates whether or not a valid operand dependency exists in the mqueue 38b, the valctl[0] signal 253a that indicates whether or not the ctl operand that is required is available yet, and the ~ctl_in_ql signal 254 that indicates whether or not a dependency exists at all in any of the mslots 39b of the mqueue 38b. When all the foregoing signals are asserted, then the AND logic gate 242 will cause assertion of the valdep signal 152a to the launch control logic 116 in order to stall the launching of a local instruction. Furthermore, when any of the foregoing inputs is deasserted, then the valdep signal 152a is not asserted, and the launch control logic 116 is permitted to make a launch request 114a (FIG. 4) to the launch arbitrator 113 (FIG. 4), provided that all other dependencies have cleared.

The valop signal 251 is received from an adjacent mslot 39b and indicates, in general, whether there is a dependency in the mqueue 38b that affects the local instruction. The valop signal 251 can be asserted on insert of the local instruction and deasserted by the previous adjacent mslot 39b. The valop signal 251 is propagated to the next adjacent mslot 39b from the local mslot 39b during the cycle of insertion of the local instruction via an AND logic gate 256 and OR logic gate 258. This architecture enables the valop signal 251 to be propagated up to four mslots 39b at a time, which corresponds with the up to four instructions that may be inserted into the mqueue 39b at a time.

The valop signal 251 is also clocked into a master/slave (m/s) latch 261 by way of a transistor 262, which is clocked by the clock CK 143. This path is utilized for clearing a dependency and enables the deasserted (clearing) valop signal 251 to be propagated at a rate of one mslot 39b per cycle, unlike the propagation of an asserted valop signal 251, which can travel up to four mslots 39b. The latch 261 outputs a delayed valop signal (valop_below_+_1) 264 that is combined with a valid signal 266 at an AND logic gate 268. The valid signal 266 is asserted or deasserted to indicate whether or not a valid instruction exists in the local mslot 39b. The AND logic gate 268 produces an output 269 that is passed to the OR logic gate 258. As mentioned, the OR logic gate 258 produces the valop signal 251 that is passed to the next adjacent mslot 39b.

The valctl[0] signal 253a is generated by the previous mslot 39b to indicate whether the dependency (the ctl producer instruction) has cleared or not. The state of the valctl signal 253a propagates from mslot 39b to mslot 39b. Generation of the valctl[0] signal 253a as well as the valctl[1] signal 253b will be described in further detail later in connection with FIG. 5B.

The ~ctl_in_ql signal 254 is generated ultimately from the ctl_in_ql signal 288. The ctl_in_ql signal 288 is initially deasserted by being precharged high on clock ~CK 143' via a transistor 287 and can be asserted by being pulled low on clock CK 143 by an mslot 39b when the mslot 39b contains a producer instruction. The ctl_inql signal 288 is broadcast to all mslots 39b so that each is aware that there is or is not a dependency in the mqueue 38b. If there is no dependency in the entire mqueue 38b, then each mslot 39b can launch without having to wait for propagation of the valctl[0] signal 253a through the various mslots 39b of the mqueue 38b.

In order to assert the ctl_in_ql signal 288, each mslot 39b is equipped with logic that includes an AND logic gate 293, a transistor 289, and a transistor 295. The AND logic gate 293 receives the set control signal 236b from the set control indicator 221 and combines this signal 236b with the valid signal 266. Recall that the valid signal 266 is asserted or deasserted to indicate whether or not a valid instruction exists in the local mslot 39b. The transistor 289 is connected between the ctl_in_ql connection 288 and the transistor 295. Moreover, the transistor 289 is actuated by the output 292 from the AND logic gate 293. The transistor 295 is connected between the transistor 289 and ground, and is actuated by the clock CK 143. Thus, as is apparent from the aforementioned configuration, the ctl_in_ql signal 288 can be asserted by being pulled low on clock CK 143 by the local mslot 39b when the mslot 39b contains a producer instruction, as signals 292 and 143 are asserted.

The ctl_in_ql signal 288 is further communicated by way of a connection 296 to an inverter 298 that outputs the ~ctl_in_ql signal 254 to the AND logic gate 142. Accordingly, when the set_ctl signal 236 is deasserted in all of the mslots 39b, then all of the valdep signals 152a from the mslots 39b are prevented from being asserted. This provides a mechanism to free all dependencies that might think they are still alive in the mqueue 38b due to the propagating status, thus bypassing the operand dependency logic 115. Hence, an mslot 39b can launch immediately if no mslot 39b in the mqueue 38b is a ctl producer instruction.

The local mslot 39b will propagate an asserted valop signal 251 to the next mslot 39b under a couple of circumstances. If the set_ctl signal 236 is asserted upon insert of a local instruction, then the local mslot 39b will propagate an asserted valop signal 251 to the next mslot 39b via AND logic gate 303 and the OR logic gate 258. If the set_ctl signal is asserted and there is a valid instruction in the local mslot 39b, then the local mslot 39b will maintain an asserted valop signal 251 to the next mslot 39b via AND logic gate 304 and the OR logic gate 258. The valop signal 251 is propagated from mslot 39b to mslot 39b to indicate that there is a dependency in the mqueue 38b.

Upon insert of the instructions into the mqueue 38b, the valop signal 251 is permitted to propagate up to four aslots and, afterward, when the local mslot 39b retires, valop signal 251 is deasserted and is propagated one mslot 39b per cycle thereafter. The foregoing limitation is implemented for reliability reasons. In essence, the valop signal 251 indicates to an mslot 39b whether or not there is a producer instruction in front of its instruction.

An execution unit data path 309 is connected between the execution unit 42 (FIG. 2) and each of the mslots 39b. Each mslot 39b includes a driver 311 that is actuated by the launch signal 272 (asserted by the MTSP producer instruction during launch), as indicated by reference arrow 312. When actuated, the driver 311 passes the delayed valop signal 264b and the latch signal 281b to the execution unit 42 via the data path 309. The aforementioned data is utilized by the execution unit 42 to route the correct version of the ctl operand to the execution unit 42. The delayed valop signal 264b indicates whether or not this load instruction should be considered for abortion.

Figure 5B:
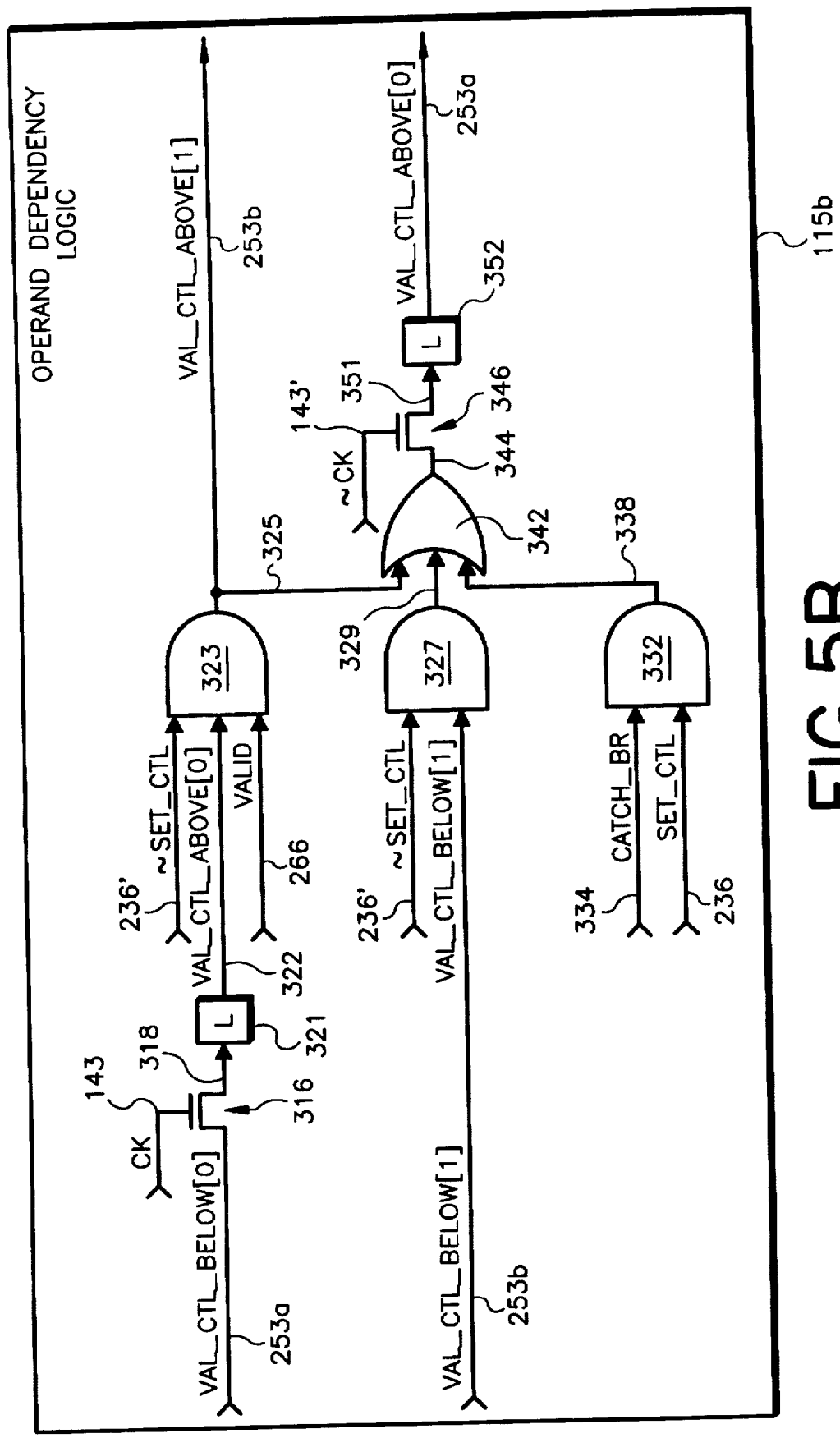

The operand dependency logic 115 (FIG. 4) further includes valctl logic 115b, as illustrated in FIG. 5B, for generating the valctl|0| signal 253a for the valdep/valop logic 115a (FIG. 5A) as well as the valctl[1] signal 253b that is used to control of the valctl[0] signal 253a. The valctl logic 115b of FIG. 5B essentially exists in parallel to the valdep/valop logic 115a (FIG. 5A) within the operand dependency logic 115 (FIG. 4). As mentioned, the valctl|0| signal 253a is implemented for performance reasons so that dependent instructions are advised of a dependency clearing prior to retirement of their producer instructions, and the valctl[1] signal 253b is implemented for timing purposes relative to the valctl|0| signal.

Referring to FIG. 5B, the valctl logic 115b of the local mslot 39b receives a valctl|0| signal 253a and a valctl|1] signal 253b from a previous adjacent mslot 39b and produces a new valctl|0| signal 253a and a new valctl[1] signal 253b for the next adjacent mslot 39b. The valctl[0] signal 253a indicates the status of the dependency, i.e., whether or not the ctl dependency is asserted (or cleared). Moreover, the valctl|1| signal 253b enables propagation of the valctl||0| 253a to propagate a distance of two mslots 39b during each cycle. If a particular mslot 39b sets the ctl dependency, then it kills the propagation of the valctl|0| signal 253a; otherwise, the valctl||0| signal 253a is permitted to propagate when asserted.

As is shown in FIG. 5B, the valctl|0| signal 253a is passed to a latch 321 by actuation of a transistor 316, which is actuated by the clock CK 143. From the latch 321, the valctl[0| signal 322 is passed to an AND logic gate 323 along with a not set_ctl (~set_ctl) signal 236' by inversion of the signal 236 from the set_ctl indicator 221 (FIG. 5A) and the valid signal 266 from the launch control logic 116 (FIG. 4). The AND logic gate 323 asserts the valctl| 1] signal 253b to the next mslot 39b when the signals 266, 322, and 236' are all asserted.

The valctl[1] signal 253b is passed to an AND logic gate 327 along with a ~set_ctl signal 236' in order to generate an output 329 for propagation control purposes.

An AND logic gate 332 receives a catch_br signal 334 and the set_ctl signal 236 from the set_ctl indicator 221 (FIG. 5A). The catch_br signal 334 is sent from the aqueue 38a to indicate whether or not the aqueue 38a has already executed the control operation. In the preferred embodiment, the aqueue 38a executes a control operation first, and then the mqueue 38b acknowledges the fact that the aqueue 38a has executed the operation by driving the catch_br signal 334. Based upon the foregoing signals, the AND logic gate 332 generates an output 338.

An OR logic gate 342 receives the output 325 from the AND logic gate 323, the output 329 from the AND logic gate 327, and the output 338 from the AND logic gate 332 in order to generate an OR logic output 344. The OR logic output 344 is passed through a transistor 346, upon actuation of the clock ~CK 143' and into a latch 352. The valctl|0| signal 253a is output by the latch 352.

Thus, as can be seen from the architecture in FIG. 5B, an asserted valctl[0] signal 253a can be propagated through an mslot 39b or the valctl[0] signal 253a can be asserted by the local mslot 39b and propagated.

Many variations and modifications may be made to the preferred embodiment of the invention as described previously. As an example, instructions in the preferred embodiment were reordered in queues 38a, 38b; however, one with skill in the art would realize that instructions can be reordered in any suitable reordering mechanism, including a reservation station. All such modifications and variations are intended to be included herein within the scope of the present invention, as is defined by the following claims. Finally, in the claims hereafter, the structures, materials, acts, and equivalents of all means-plus-function elements and all step-plus-function elements are intended to include any structures, materials, or acts for performing the specified functions.

Wherefore, the following is claimed:

1. A method for tracking operand dependencies in a processor that executes instructions out of order, comprising the steps of:

(a) acquiring a set of instructions for execution;

(b) detecting a producer instruction and a dependent instruction in a set that is potentially dependent upon said producer instruction, said producer instruction destined to modify data in a register that stores address information;

(c) commencing execution of said dependent instruction after said producer instruction commences execution;

(d) while executing said dependent instruction, determining whether said dependent instruction is destined to use said data in said register;

(e) when said dependent instruction is destined to use said data in said register, then aborting said execution of said dependent instruction until after said producer instruction retires from execution; and (f) when said dependent instruction is not destined to use said data in said register, then completing execution of said dependent instruction regardless of when said producer retires from execution.

2. The method of claim 1, wherein step (a) comprises the step of placing said instructions in respective slots of an instruction reordering mechanism and wherein step (c) comprises the steps of:

determining that said producer instruction and that said dependent instruction reside in first and second slots respectively;

asserting and propagating a dependency signal successively through said slots from said first slot to said second slot when said producer and dependent instructions are determined; and preventing said dependent instruction from launching execution when said second slot receives said asserted dependency signal; and deasserting and propagating said dependency signal successively through said slots from said first slot to said second slot when said producer instruction launches execution; and permitting said dependent instruction to commence execution when said second slot receives said deasserted dependency signal.

3. The method of claim 2, further comprising the steps of:

determining when no producer instructions exist in any of said slots; and broadcasting a signal concurrently to said slots to indicate when no producer instructions exist in any of said slots.

4. The method of claim 2, further comprising the steps of:

updating said valid dependency signal upon insert and retirement of each instruction into and from its corresponding slot respectively;

producing a second valid operand signal for said following slot to indicate whether said local instruction is to produce said operand data for said remote dependent instruction; and updating said second valid operand signal when said local instruction has completed execution, but prior to said retirement.

5. The method of claim 1, wherein said operand dependencies are move-to-space (MTSP) operand dependencies, said producer instruction is an MTSP instruction, and said dependent instruction is a load instruction.

6. The method of claim 1, further comprising the steps of:

distributing arithmetic and memory instructions into respective arithmetic and memory queues; and performing steps (a) through (e) upon corresponding instructions in said memory queue.

7. The method of claim 1, wherein said register is a space register.

8. A method for tracking move-to-space (MTSP) operand dependencies in a processor that executes instructions out of order, comprising the steps of:

(a) detecting an MTSP instruction and a load instruction that is potentially dependent upon said MTSP instruction, said MTSP instruction destined to modify data in a space register that stores virtual address information;

(b) commencing execution of said load instruction after said MTSP instruction commences execution;

(c) while executing said load instruction, determining whether said load instruction is destined to use said data in said space register;

(d) when said load instruction is destined to use said data in said space register, then performing the following steps:

(1) determining if said MTSP instruction is retired;

(2) when said MTSP instruction is not retired, then aborting said execution of said load instruction and repeating steps (b) and (d)(1) successively until said MTSP instruction is retired from execution; and (3) when said MTSP instruction is retired, completing execution of said load instruction; and (e) when said load instruction is not destined to use said data in said space register, then completing execution of said load instruction regardless of when said MTSP instruction retires from execution.

9. A system for tracking operand dependencies in a processor, the processor including an instruction reordering mechanism for executing said instructions in an out of order sequence, the system comprising:

first logic for detecting a producer instruction and a dependent instruction that is potentially dependent upon said producer instruction, said producer instruction destined to modify data in a space register that stores address information;

second logic for commencing execution of said dependent instruction after said producer instruction commences execution;

third logic for, while executing said dependent instruction, determining whether said dependent instruction is destined to use said data in said space register;

fourth logic for, when said dependent instruction is destined to use said data in said space register, aborting said execution of said dependent instruction until after said producer instruction retires from execution; and fifth logic for, when said dependent instruction is not destined to use said data in said space register, completing execution of said dependent instruction regardless of when said producer instruction retires from execution.

10. The system of claim 9, further comprising:

a plurality of slots in said reordering mechanism for receiving respective instructions;

a set dependency latch in each said slot, said set dependency latch producing a set dependency signal that indicates whether a local instruction in a local slot is to produce operand data to be used by a remote dependent instruction that follows said local instruction in program order;

valid operand propagation logic in each said slot, said valid operand propagation logic configured to produce a valid operand signal for a following slot to indicate whether said producer instruction exists in said program order prior to a following instruction in said following slot; and valid dependent logic in each said slot, said valid dependent logic configured to prevent said local instruction from launching execution until after said remote producer instruction commences execution, based upon said use dependency signal and said valid operand signal from a previous slot.

11. The system of claim 10, further comprising:

logic for updating said valid dependency signal upon insert and retirement of each instruction into and from its corresponding slot respectively;

logic for producing a second valid operand signal for said following slot to indicate whether said local instruction is to produce said operand data for said remote dependent instruction; and logic for updating said second valid operand signal when said local instruction has completed execution, but prior to said retirement.

12. The system of claim 10, further comprising logic for broadcasting said set dependency signal among each of said slots.

13. The system of claim 9, wherein said operand dependencies are move-to-space (MTSP) operand dependencies, said producer instruction is an MTSP instruction, and said dependent instruction is a load instruction.

14. The system of claim 9, further comprising:

arithmetic and memory queues associated with said reordering mechanism;

a sort mechanism configured to identify arithmetic and memory instructions that are fetched, said sort mechanism configured to distribute said arithmetic and memory instructions into said arithmetic and memory queues, respectively; and wherein said producer and said dependent instruction are placed in and executed from said memory queue.

15. A system for tracking operand dependencies in a processor that executes instructions out of order, comprising:

an execution unit configured to execute instructions;

a fetch mechanism associated with said processor, said reordering mechanism for communicating said instructions in an out of order sequence to said execution unit, said reordering mechanism comprising:

first means for detecting a producer instruction and a dependent instruction that is potentially dependent upon said producer instruction, said producer instruction destined to modify data in a space register that stores address information;

second means for commencing execution of said dependent instruction after said producer instruction commences execution;

third means for, while executing said dependent instruction, determining whether said dependent instruction is destined to use said data in said space register;

fourth means for, when said dependent instruction is destined to use said data in said space register, aborting said execution of said dependent instruction until after said producer instruction retires from execution; and fifth means for, when said dependent instruction is note destined to use said data in said space register, completing execution of said dependent instruction regardless of when said producer instruction retires from execution.

16. The system of claim 15, further comprising:

a plurality of slots in said reordering mechanism for receiving respective instructions;

a set dependency latch in each said slot, said set dependency latch producing a set dependency signal that indicates whether a local instruction in a local slot is to produce operand data to be used by a remote dependent instruction that follows said local instruction in program order;

valid operand propagation logic in each said slot, said valid operand propagation logic configured to produce a valid operand signal for a following slot to indicate whether said producer instruction exists in said program order prior to a following instruction in said following slot; and valid dependent logic in each said slot, said valid dependent logic configured to prevent said local instruction from launching execution until after said remote producer instruction commences execution, based upon said use dependency signal and said valid operand signal from a previous slot.

17. The system of claim 16, further comprising:

means for updating said valid dependency signal upon insert and retirement of each instruction into and from its corresponding slot respectively;

means for producing a second valid operand signal for said following slot to indicate whether said local instruction is to produce said operand data for said remote dependent instruction; and means for updating said second valid operand signal when said local instruction has completed execution, but prior to said retirement.

18. The system of claim 16, further comprising logic for broadcasting said set dependency signal among each of said slots.

19. The system of claim 15, wherein said operand dependencies are move-to-space (MTSP) operand dependencies, said producer instruction is an MTSP instruction, and said dependent instruction is a load instruction.

* * * * *